(12) United States Patent
Lutz et al.

(10) Patent No.: US 9,696,964 B2
(45) Date of Patent: Jul. 4, 2017

(54) MULTIPLY ADDER

(71) Applicant: ARM LIMITED, Cambridge (GB)

(72) Inventors: David Raymond Lutz, Austin, TX (US); Neil Burgess, Austin, TX (US)

(73) Assignee: ARM Limited, Cambridge (GB)

( * ) Notice: Subject to any disclaimer, the term of this patent is extended or adjusted under 35 U.S.C. 154(b) by 259 days.

(21) Appl. No.: 14/566,981

(22) Filed: Dec. 11, 2014

(65) Prior Publication Data

US 2015/0199173 A1   Jul. 16, 2015

(30) Foreign Application Priority Data

Jan. 15, 2014 (GB) .................................. 1400644.9

(51) Int. Cl.
*G06F 7/544* (2006.01)
*G06F 7/483* (2006.01)

(52) U.S. Cl.
CPC ............ *G06F 7/5443* (2013.01); *G06F 7/483* (2013.01)

(58) Field of Classification Search
CPC ......... G06F 7/483; G06F 7/487; G06F 7/4876
See application file for complete search history.

(56) References Cited

U.S. PATENT DOCUMENTS

| 5,761,105 | A * | 6/1998 | Goddard ................. G06F 7/483 708/490 |
| 5,768,169 | A * | 6/1998 | Sharangpani ........... G06F 7/483 708/204 |
| 8,244,789 | B1 * | 8/2012 | Langhammer ...... G06F 7/49936 708/497 |
| 2007/0074008 | A1 | 3/2007 | Donofrio |
| 2010/0063987 | A1 | 3/2010 | Boersma et al. |
| 2010/0125621 | A1 | 5/2010 | Oliver et al. |
| 2011/0072066 | A1 | 3/2011 | Lutz |
| 2013/0007075 | A1 | 1/2013 | Oliver et al. |

OTHER PUBLICATIONS

Search Report for GB 1400644.9 dated Jun. 24, 2014, four pages.

* cited by examiner

*Primary Examiner* — Chuong D Ngo

(74) *Attorney, Agent, or Firm* — Nixon & Vanderhye P.C.

(57) ABSTRACT

A floating point multiply add circuit 24 includes a multiplier 26 and an adder 28. The input operands A, B and C together with the result value all have a normal exponent value range, such as a range consistent with the IEEE Standard 754. The product value which is passed from the multiplier 26 to the adder 28 as an extended exponent value range that extents lower than the normal exponent value range. Shifters 48, 50 within the adder can take account of the extended exponent value range of the product as necessary in order to bring the result value back into the normal exponent value range.

8 Claims, 5 Drawing Sheets

* IEEE-754 (exponent range)
unrounded product (extended exponent range)

US 9,696,964 B2

MULTIPLY ADDER

BACKGROUND OF THE INVENTION

This application claims priority to GB Patent Application No. 1400644.9 filed 15 Jan. 2014, the entire content of which is hereby incorporated by reference.

This disclosure relates to the field of data processing systems. More particularly, this disclosure relates to multiply add arithmetic within data processing systems.

It is known to provide data processing systems with arithmetic circuitry that performs multiply add operations of the form A+(B*C), where A, B and C are all floating point numbers. The input operands and the output results will typically have an expected format specifying an exponent value and a mantissa value for the floating point number concerned. The number of bits used to represent the floating point number will place a constraint upon the range of possible exponent values that are supported for a given floating point number format. One example of such floating point number formats are given in the IEEE Standard 754.

SUMMARY

At least some example embodiments of the present disclosure provide apparatus for performing an arithmetic operation A+(B*C), where A, B and C are floating point numbers each having an exponent value within an exponent value range and a mantissa value, said apparatus comprising:

a multiplier configured to multiply B and C to generate a product having a product mantissa value and a product exponent value; and an adder configured to add A and said product to generate a result value; wherein said multiplier is configured to generate said product exponent value passed to said adder with an extended exponent value range that extends to lower values than said exponent value range; and said adder is configured to receive said product exponent value with said extended exponent value range and to generate said result value with a result exponent within said exponent value range.

At least some example embodiments of the present disclosure provides apparatus for performing an arithmetic operation A+(B*C), where A, B and C are floating point numbers each having an exponent value within an exponent value range and a mantissa value, said apparatus comprising:

multiplier means for multiplying B and C to generate a product having a product mantissa value and a product exponent value; and adder means for adding A and said product to generate a result value; wherein said multiplier means generates said product exponent value passed to said adder with an extended exponent value range that extends to lower values than said exponent value range; and said adder means receives said product exponent value with said extended exponent value range and generates said result value with a result exponent within said exponent value range.

At least some example embodiments of the present disclosure provides a method of performing an arithmetic operation A+(B*C), where A, B and C are floating point numbers each having an exponent value within an exponent value range and a mantissa value, said apparatus comprising the steps of:

multiplying B and C to generate a product having a product mantissa value and a product exponent value; and adding A and said product to generate a result value; wherein said step of multiplying generates said product exponent value passed to an adder with an extended exponent value range that extends to lower values than said exponent value range; and said step of adding receives said product exponent value with said extended exponent value range and generates said result value with a result exponent within said exponent value range.

The above, and other objects, features and advantages of this disclosure will be apparent from the following detailed description of illustrative embodiments which is to be read in connection with the accompanying drawings.

DESCRIPTION OF EXAMPLE EMBODIMENTS

Figure 1:
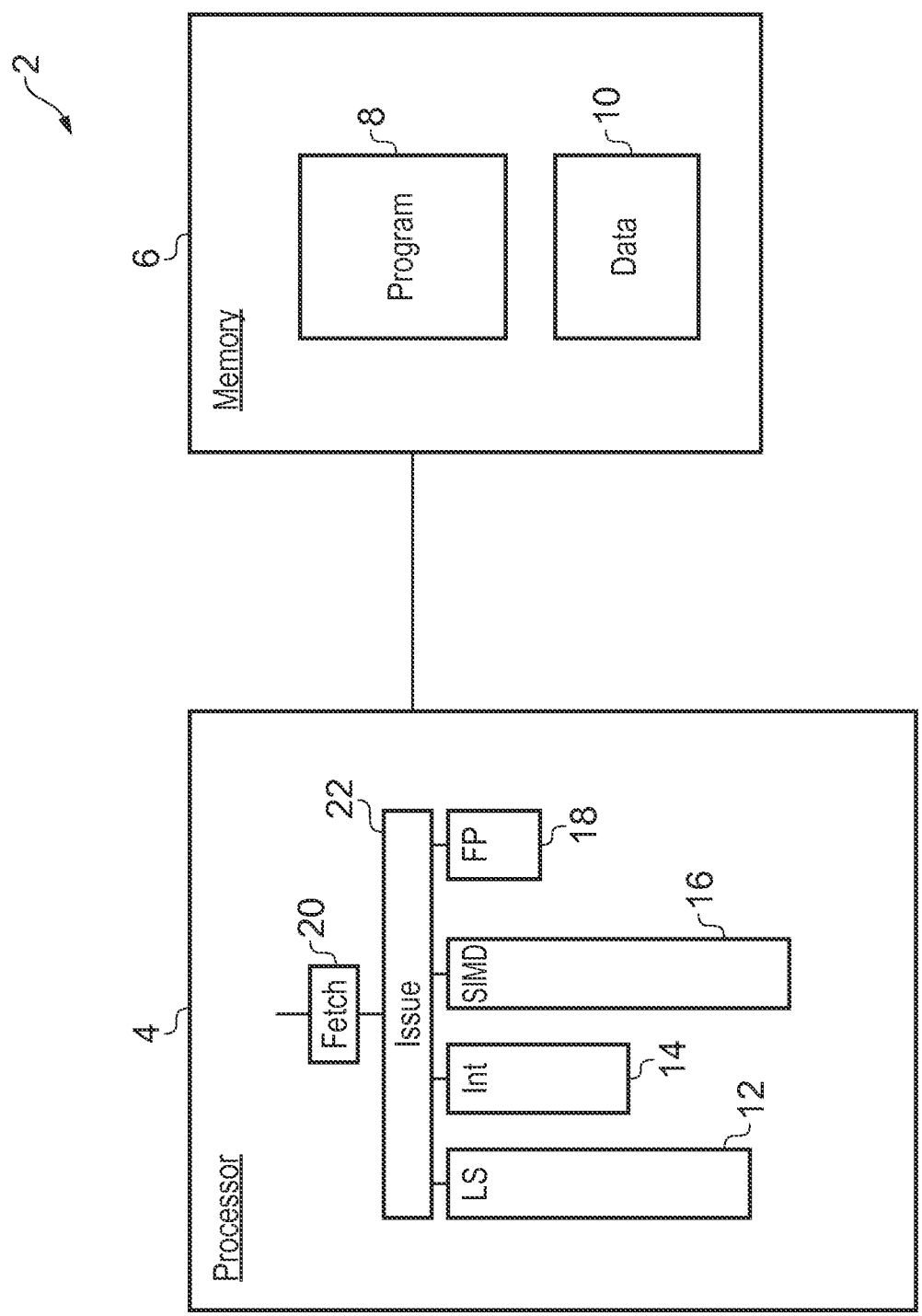
FIG. 1 schematically illustrates a data processing system including a processor having a floating point pipeline which includes multiply adder circuitry.

At least some example embodiments of the present technique recognises that while the input operands A, B and C to a multiply add operation together with the result value may all have exponents within an exponent value range, it is possible to use an extended exponent value range for the product exponent which is passed between the multiplier and the adder. This extended exponent value range extends lower than the (normal) exponent value range thereby increasing the number of ways in which subnormal floating point product values may be represented. Accordingly, a requirement to shift the product value so that the product exponent falls within the (normal) exponent value range may be avoided and the consequent time taken to perform such a shift also avoided. This increases the speed with which a multiply add operation may be performed. The technique recognises that the adder will typically already include shifters for aligning the operand A and the product as part of the add operation and accordingly any additional shift arising due to the product exponent lying outside of the (normal) exponent value range may be accommodated within the shift operation performed in the adder without introducing extra processing delay.

The product passed from the multiplier to the adder may be unrounded. Accordingly, the mantissa (or fraction) passed from the multiplier to the adder will include more bits than are available to represent the mantissa within the inputs or the outputs, but are required to achieve the desired level of accuracy within the results being calculated. This form of multiply add circuitry is a fused multiply adder.

In order to efficiently deal with subnormal input operands to the multiplier (i.e. floating point numbers with a magnitude such that with the smallest exponent value which can be represented, the mantissa value starts with one or more zeros rather than the normally assumed leading "1" at the head of the mantissa) some embodiments are such that said multiplier comprises:

first count-leading-zero circuitry configured to determine a count value CLZB of a number of leading zeros in a mantissa value of B;

a first shifter configured to left shift said mantissa of B by CLZB places to form a shifted mantissa of B if CLZB is greater than zero;

second count-leading-zero circuitry configured to determine a count value CLZC of a number of leading zeros in a mantissa value of C; and a second shifter configured to left shift said mantissa of C by CLZC places to form a shifted mantissa of C if CLZC is greater than zero.

In some embodiments the multiplier may be configured to form the product exponent as a sum of at least an exponent value of B, an exponent value of C, −CLZB and −CLZC. Accordingly, the product exponent value with its extended exponent value range may take account of any left shifts which have been performed upon the mantissa values of B and C.

In some embodiments an overflow value may be added into the product exponent to take account of an overflow from the assumed MSB position when the product of the mantissa of B and the mantissa of C is calculated.

The adder may include an adder shifter responsive to the exponent value of A and the product exponent to perform a shift operation of at least one of the mantissa of A and the product mantissa to align these in magnitude before the addition is performed. This adder shifter is responsive to the extended exponent value range of the product exponent in determining the shifts to be performed to the mantissa of A and the product mantissa.

In some embodiments the multiplier may be configured to generate an out-of-range exponent flag signal which is sent to the adder to indicate that the product exponent has a value lower than the (normal) exponent value range. Such a flag signal may be used to switch in any additional processing required to handle the product exponent if this falls outside of the (normal) exponent value range.

While not restricted to such use, the present technique may be employed within systems in which the exponent value range is in accordance with IEEE Standard 754 and the extended exponent value range includes negative exponent values. It will be appreciated that the particular ranges will depend upon the precision of the floating point numbers being represented, e.g. single precision or double precision.

FIG. 1 schematically illustrates a data processing apparatus 2 in the form of a processor 4 coupled to a memory 6. The memory 6 stores a program 8 and data 10. The program 8 comprises program instructions which, when executed by the processor 4, manipulate the data 10. The program instructions may include floating point program instructions. These floating point program instructions may include multiply add instructions. The floating point instructions operate upon floating point numbers comprising an exponent value and a mantissa value. These values may be represented in accordance with the IEEE Standard 754. It will be appreciated that the use of other floating point standards is also possible and that the present techniques are not limited to use with the IEEE standard 754. A mantissa value when the exponent is within the normal exponent value range will include an implied "1" at its most significant bit position. Accordingly, the data actually manipulated and stored will be the fractional part of the mantissa and the leading "1" will be assumed. In the case of a subnormal number where the exponent value is out of range (the exponent is at its minimum value), the assumed leading "1" will not be present and instead there will be a variable number of leading "0" values. The leading value of the mantissa will be assumed to be a "0" and the number of zeros leading the fractional value may be counted in order to determine the effective exponent value of the floating point number concerned.

The processor 4 of FIG. 1 includes several execution pipelines including a load store pipeline 12, an integer pipeline 14, a SIMD pipeline 16 and a floating point pipeline 18. Program instructions fetched from the memory 6 by a fetch stage 20 are passed to an issue stage 22 where they are issued into an appropriate one of the execution pipelines 12, 14, 16, 18. The floating point pipeline 18 includes circuitry for performing a multiply add operation upon floating point numbers as will be described further below.

The number of processing cycles taken to perform a multiply add operation may be an important performance characteristic. Some embodiments may advantageously reduce the number of processing cycles taken to perform a multiply add operation.

Figure 2:
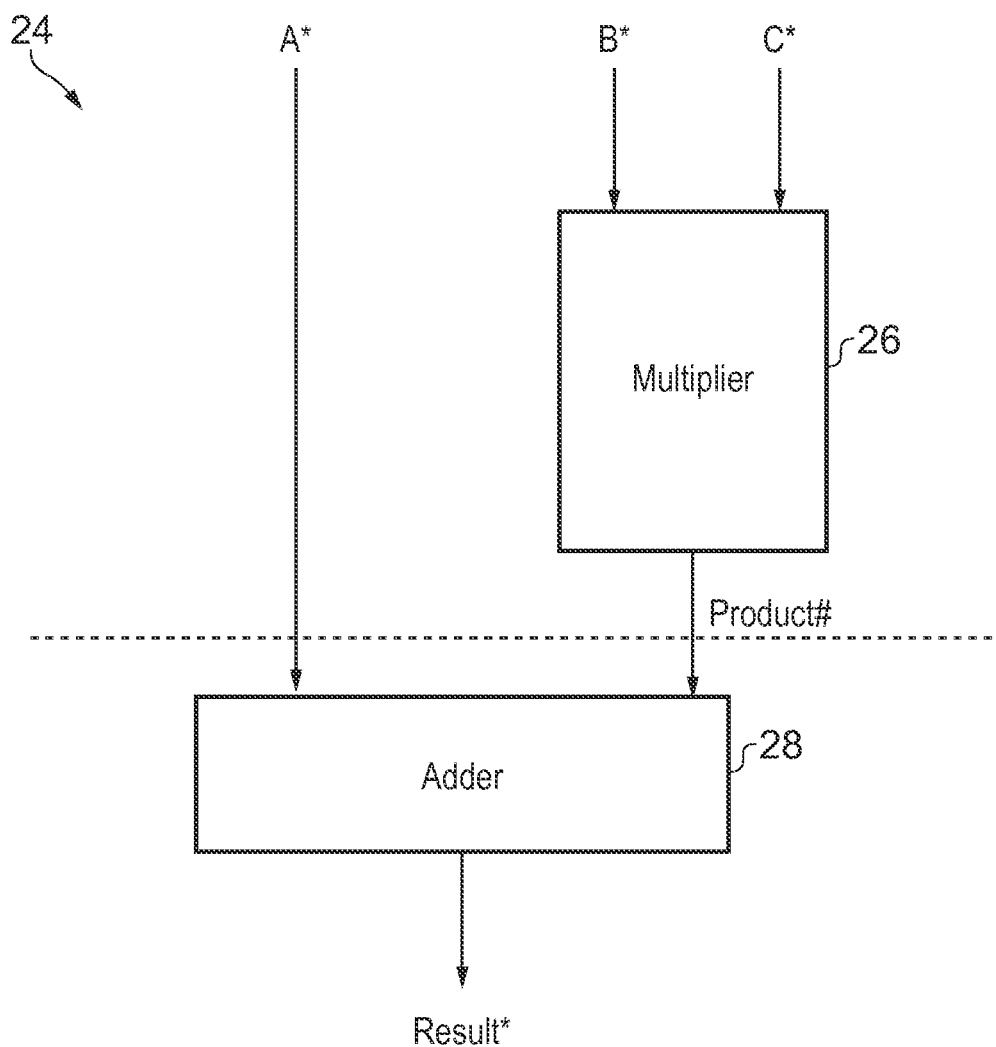
FIG. 2 schematically illustrates multiply adder circuitry and the format of data values at various points.

FIG. 2 schematically illustrates multiply add circuitry 24 including a multiplier 26 and an adder 28. The input operands to the multiply add circuitry 24 are A, B and C. Each of these input operands may have the IEEE Standard 754 format and accordingly have an exponent value range dependent upon the precision of the number concerned (i.e. the normal exponent value range). The multiplier 26 performs a multiplication of the operands B and C to produce a product. This product is passed to the adder 28 where it is added to the operand A. The output from the adder 28 is a result value which also has the IEEE Standard 754 format.

In accordance with the present techniques, the output from the multiplier 26 to the adder 28 (i.e. the product) is an unrounded value and has an extended exponent value range. This extended exponent value range extends lower (e.g. to negative exponent values) than the exponent value range employed for A, B, C and the result value. Adapting the multiplier 26 to generate a product with such an extended exponent value range and the adder 28 to receive the product with such an extended exponent value range avoids any need to manipulate the product back into a form having the exponent value range (normal exponent value range) between the multiplier 26 and the adder 28. Avoiding this additional manipulation speeds up the operation of the multiply add circuitry 24.

Figure 3:
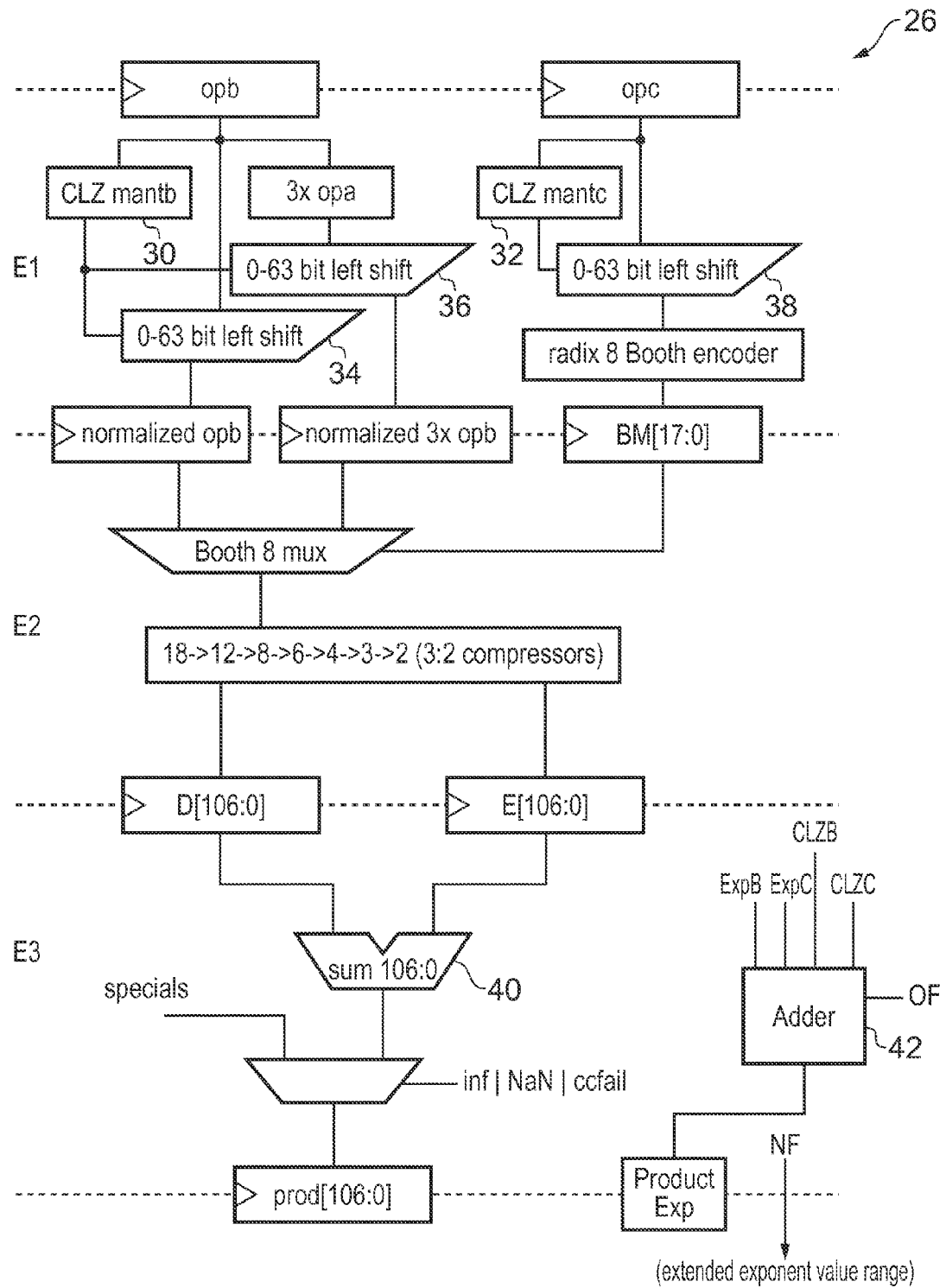
FIG. 3 schematically illustrates a portion of a multiplier.

FIG. 3 schematically illustrates the multiplier 26. There are three execution stages E1, E2 and E3. In the first stage E1, count-leading-zero circuitry 30, 32 respectively count the number of leading zeros in the mantissa of the operands B and C. Shifters 34, 36, 38 then shift these mantissa values (and derivatives thereof required for methods adding larger and/or signed multiples of the base product, e.g. Booth multipliers) to form the outputs from the stage E1. Left shifts will be applied when the mantissa concerned is subnormal in order to align the mantissas for B and C before the Booth multiplication operation is performed. These applied shifts are held in the count leading zero values determined and are used to form the product exponent value for the product value which is passed to the adder 28. In particular, the count-leading-zero circuitry 30 determines a count leading zero value CLZB for the mantissa of B. The count-leading-zero circuitry 34 determines a count leading zero value CLZC for the mantissa of C.

The second stage E2 within the multiplier 26 performs the Booth multiplication and generates two 107-bit partial product values D and E which are supplied to the third stage E3.

The third stage E3 performs a bit addition of these partial products with an adder 40. The resulting product mantissa is an unrounded value as consistent with the operation of the fused multiply add circuitry described herein. The product mantissa is output from the multiplier 26 providing an exception such as an infinity, a not-a-number or a condition code both failed does not occur. If any of these conditions do arise, then a special value is output from the multiplier 26 instead of the product mantissa.

The exponent value of the operand B, the exponent value of the operand C, the CLZB value and the CLZC value are used by the multiplier 26 to form the product exponent value which has an extended exponent value range (extends lower that the normal exponent value range) and that is passed to the adder 28. An adder 42 within the multiplier 26 performs a sum of the above exponent inputs together with a value indicating whether an overflow occurred when the product mantissa was calculated so as to form the product exponent. The adder 42 thus performs a sum of the exponent of B, the exponent of C, −CLZB, −CLZC and an overflow value.

Figure 4:
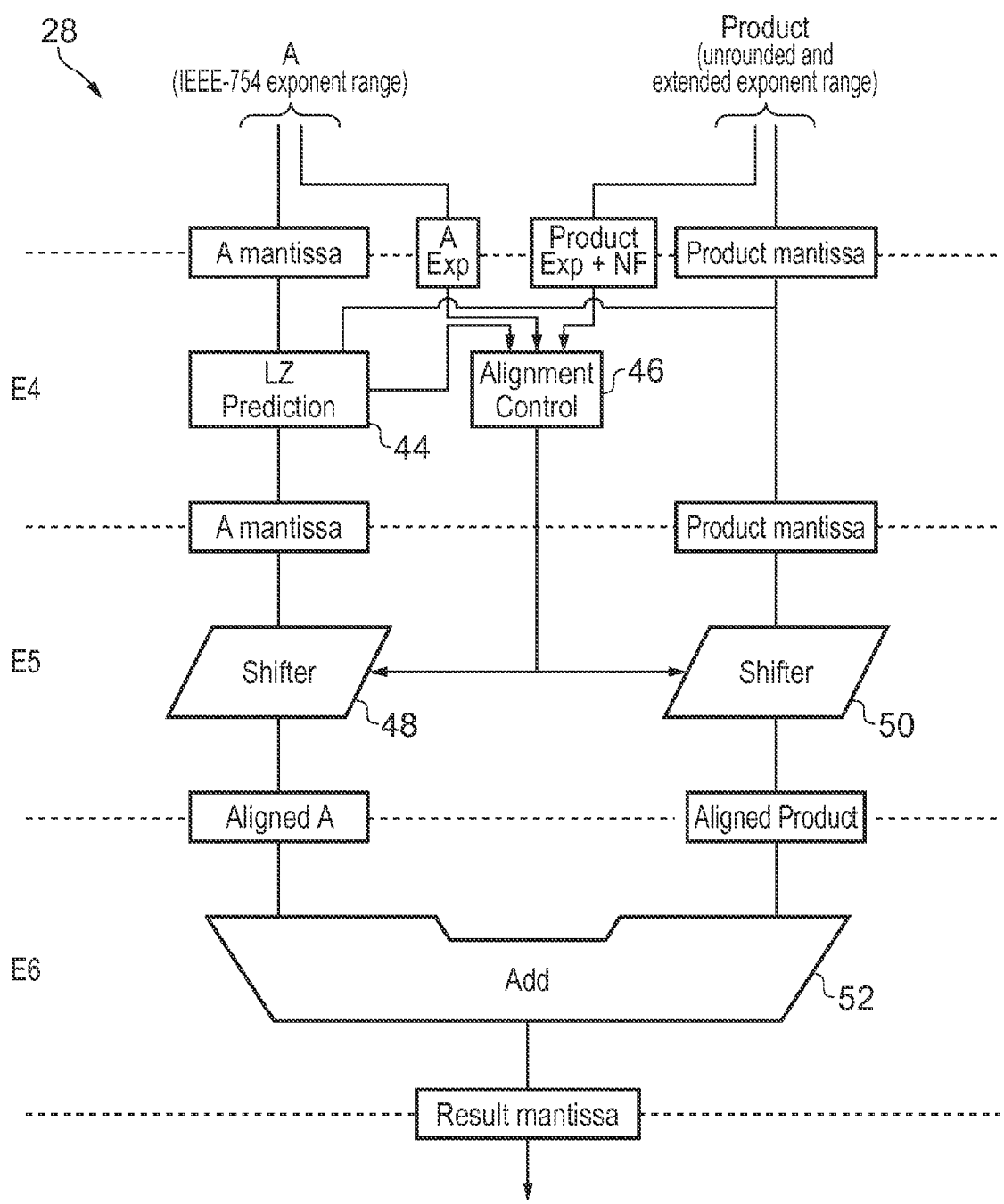
FIG. 4 schematically illustrates a portion of an adder.

FIG. 4 schematically illustrates the adder 28 formed of three stages E4, E5 and E6. The adder 28 receives the input operand A in the IEEE Standard 754 format with the normal exponent value range as well as the product output from the multiplier 26 which is unrounded and which has the extended exponent value range. A negative flag value NF is also passed between the multiplier 26 and the adder 28 to indicate that the product exponent lies within a region lower than that represented by the normal exponent value range. This negative flag may be used to control manipulation of the product exponent in a manner that is consistent with it representing negative values when the normal exponent value range is assumed to be a positive value.

Within the stage E4 a leading zero prediction circuit 44 determines whether or not the sum of the mantissa of A and the product mantissa will have any leading zeros. This together with the exponent value for A and the product exponent value (including negative flag) are supplied to alignment control circuitry 46 which determines any shifts to be applied to the mantissa of A and the product mantissa before they are added.

Shifters 48, 50 within stage E5 will apply shifts as determined by the alignment control circuitry 46 to form an aligned value of A and an aligned product value which can then be supplied to a bit adder 52 in the stage E6 of the adder 28 to form the result mantissa value. It will be appreciated that the shifters 48 and 50 are controlled by the alignment control circuitry 46 which itself is responsive to the product exponent value having the extended exponent value range. Accordingly, the shifters 48, 50 can be controlled to perform any required shift necessary to bring the result value back into the normal exponent value range as may be required to generate an IEEE Standard 754 compliant result value. There is no need to bring the exponent value of the product passed from the multiplier 26 to the adder 28 back into the normal exponent value range of the IEEE Standard 754 format as any necessary adjustment can be made in the shifts performed by the shifters 48, 50 within the adder 28 without incurring an additional time penalty.

Compared with a standard adder, the present technique sends the adder on extra bit (NF) indicating that the product exponent is to be treated as a negative number (i.e. what would otherwise look like a large exponent is in fact a very small exponent). The alignment control circuitry 46 receives the negative flag value NF and treats the exponent value accordingly.

Figure 5:
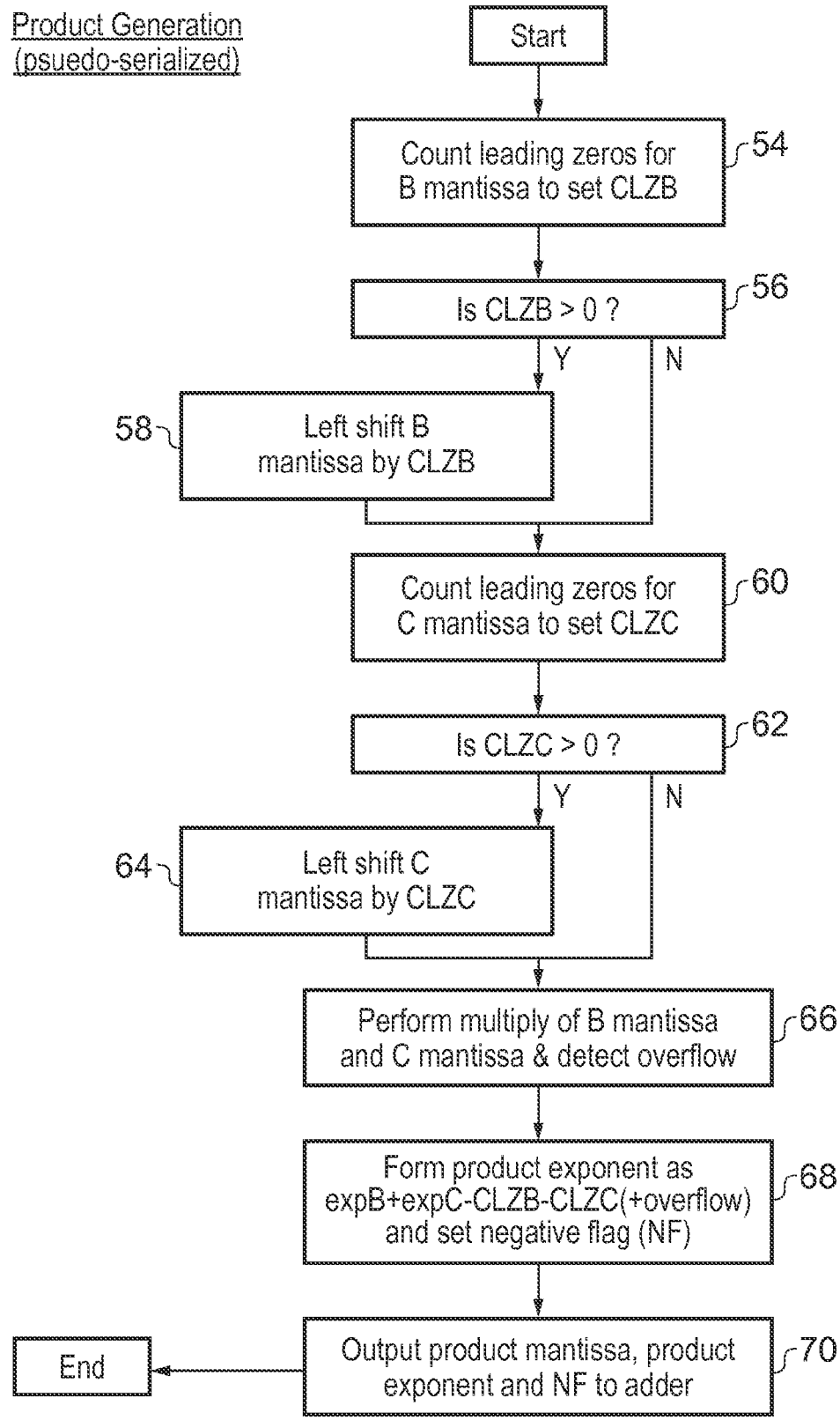
FIG. 5 is a flow diagram schematically illustrating the operation of the multiplier of FIG. 3.

FIG. 5 is a flow diagram schematically illustrating the operation of the multiplier 26. FIG. 5 shows the processing occurring in a serial manner. It will be appreciated that in practice the multiplier circuitry 26 may perform various of these operations parallel or in a different order. It will also be appreciated that in other embodiments the roles of "1"s and "0"s may be reversed in a manner that will be understood by those in this field to operate in a similar manner.

At step 54 a count of leading zeros for B mantissa is made and the value CLZB is set accordingly. Step 56 determines whether the count leading zero value for the mantissa B is greater than zero. If the count leading zero value is greater than zero, then step 58 left shifts the B mantissa by the CLZB value. If the CLZB value is zero, then step 58 is bypassed.

At step 60 the leading zeros of the C mantissa are counted and used to set the CLZC value. Step 62 determines whether the CLZC value is greater than zero. If the CLZC value is greater than zero, then step 64 serves to left shift the C mantissa by a number of places corresponding to the CLZC value. If the determination at step 62 is that the CLZC value is not greater than zero, then step 64 is bypassed.

At step 66 a multiply of the B mantissa and C mantissa is performed and any overflow is detected. At step 68 the product exponent is formed as the sum of the exponent of B, the exponent of C, −CLZB, −CLZC and a value of +1 if an overflow at step 66 was detected. If the product exponent so calculated is negative, then a negative flag NF is set to signal this to the adder 28. At step 70 the product mantissa, the product exponent and the negative flag are output to the adder 28.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for performing an arithmetic operation A+(B*C), where A, B and C are floating point numbers each having an exponent value within an exponent value range and a mantissa value, said apparatus comprising:
   multiplier circuitry configured to multiply B and C to generate a product having a product mantissa value and a product exponent value; and
   adder circuitry configured to add A and said product to generate a result value; wherein
   said multiplier circuitry is configured to generate said product exponent value passed to said adder circuitry within an extended exponent value range that extends to lower values than said exponent value range, wherein said multiplier circuitry is configured, when said product exponent has a value lower than said exponent value range, to generate an out-of-range exponent flag signal sent to said adder circuitry; and
   said adder circuitry is configured to receive said product exponent value within said extended exponent value range, to determine how to interpret said product exponent value in dependence on whether said out-of-range exponent flag signal has been generated by said multiplier circuitry, and to generate said result value with a result exponent within said exponent value range.

2. Apparatus as claimed in claim 1, wherein said product passed from said multiplier circuitry to said adder circuitry is unrounded.

3. Apparatus as claimed in claim 1, wherein said multiplier circuitry comprises:
first count-leading-zero circuitry configured to determine a first count value of a number of leading zeros in a mantissa value of B;
a first shifter configured to left shift said mantissa of B by a number of places equal to said first count value to form a shifted mantissa of B if said first count value is greater than zero;
second count-leading-zero circuitry configured to determine a second count value of a number of leading zeros in a mantissa value of C; and
a second shifter configured to left shift said mantissa of C by a number of places equal to said second count value to form a shifted mantissa of C if said second count value is greater than zero.

4. Apparatus as claimed in claim 3, wherein said multiplier circuitry is configured to form said product exponent as a sum of at least an exponent value of B, an exponent value of C, minus said first count value and minus said second count value.

5. Apparatus as claimed in claim 1, wherein said adder circuitry comprises an adder shifter responsive to an exponent value of A and said product exponent to perform a shift operation upon at least one of a mantissa of A and said product mantissa to align in magnitude said mantissa of A and said product mantissa.

6. Apparatus as claimed in claim 1, wherein said exponent value range is in accordance with IEEE Standard 754 and said extended exponent value range includes negative exponent values.

7. Apparatus for performing an arithmetic operation A+(B*C), where A, B and C are floating point numbers each having an exponent value within an exponent value range and a mantissa value, said apparatus comprising:
means for multiplying B and C to generate a product having a product mantissa value and a product exponent value; and
means for adding A and said product to generate a result value; wherein
said means for multiplying is configured to generates said product exponent value passed to said means for adding within an extended exponent value range that extends to lower values than said exponent value range, wherein said means for multiplying is configured to, when said product exponent has a value lower than said exponent value range, generate an out-of-range exponent flag signal sent to said means for adding; and
said means for adding is configured to receives said product exponent value within said extended exponent value range, determine how to interpret said product exponent value in dependence on whether said out-of-range exponent flag signal has been generated by said means for multiplying, and generates said result value with a result exponent within said exponent value range.

8. A method of performing an arithmetic operation A+(B*C), where A, B and C are floating point numbers each having an exponent value within an exponent value range and a mantissa value, said method comprising the steps of:
multiplying, by multiplying circuitry, B and C to generate a product having a product mantissa value and a product exponent value; and
adding, by adding circuitry, A and said product to generate a result value; wherein
said step of multiplying generates, by the multiplying circuitry, said product exponent value passed to the adding circuitry within an extended exponent value range that extends to lower values than said exponent value range, wherein said step of multiplying, when said product exponent has a value lower than said exponent value range, generates an out-of-range exponent flag signal; and
said step of adding includes the adding circuitry receiving said product exponent value within said extended exponent value range, determining how to interpret said product exponent value in dependence on whether said out-of-range exponent flag signal has been generated, and generating said result value with a result exponent within said exponent value range.

* * * * *